United States Patent

Wheeler et al.

[11] Patent Number: 5,919,585
[45] Date of Patent: Jul. 6, 1999

[54] BATTERY PACK FOR CORDLESS DEVICE

[75] Inventors: Dale K. Wheeler, Fallston; Robert G. Moores, Jr., Reisterstown; Richard T. Walter, Baldwin, all of Md.

[73] Assignee: Black & Decker, Inc., Newark, Del.

[21] Appl. No.: 08/985,000

[22] Filed: Dec. 4, 1997

Related U.S. Application Data

[63] Continuation of application No. 08/883,759, Jun. 27, 1997, Pat. No. 5,789,101, which is a continuation of application No. 08/766,926, Dec. 13, 1996, abandoned, which is a continuation of application No. 08/486,666, Jun. 7, 1995, Pat. No. 5,620,808, which is a continuation of application No. 08/239,437, May 6, 1994, Pat. No. 5,489,484, which is a continuation of application No. 08/065,736, May 21, 1993, abandoned, which is a continuation of application No. 08/042,937, Apr. 5, 1993, abandoned.

[51] Int. Cl.$^6$ .................................................. H01M 2/10
[52] U.S. Cl. .............................. 429/97; 429/99; 429/123; 361/434
[58] Field of Search .............................. 429/96–100, 123; 361/434

[56] References Cited

U.S. PATENT DOCUMENTS

3,734,207  5/1973  Fishbein .
4,013,907  3/1977  Mabuchi .
4,265,984  5/1981  Kaye .
4,678,259  7/1987  Totty .
5,108,847  4/1992  Edwards et al. .
5,122,427  6/1992  Flowers et al. .
5,250,371  10/1993  Kleinert et al. .

*Primary Examiner*—Stephen Kalafut
*Attorney, Agent, or Firm*—Adan Ayala

[57] ABSTRACT

A battery pack 13 comprises an elongated cylindrical, metal casing 35, a plurality of cells 41, 43 in casing 35 and three coaxial pack terminals 46, 54, 61. For enhanced convenience, pack terminals 46, 54, 61 are electrically connectable in a cordless device 11 regardless of the angular orientation of the pack 13 about casing axis 33. To reduce cost and increase durability, pack 13 has no welded connections and will permit high current discharge rates. Cells 41, 43 are electrically connected but are mechanically disconnected. A spring 73 engages cell 41 and biases cells 41, 43 tightly together in compression to form good, low resistance electrical contact between cells 41, 43, casing base cap 45 and top 53. To provide a pack with two output voltages, the third pack terminal 61 has a polarity (relative to first pack terminal 46) the same as second pack terminal 54 and is electrically connected to the cell can terminal 43b of forward cell 43, thereby electrically by-passing cell 43.

25 Claims, 7 Drawing Sheets

BATTERY PACK FOR CORDLESS DEVICE

CROSS REFERENCE TO RELATED APPLICATION

This application is a continuation of application Ser. No. 08/883,759, filed Jun. 27, 1997 now U.S. Pat. No. 5,789, 101; which is a continuation of application Ser. No. 08/766, 926, filed Dec. 13, 1996 now abandoned; which is a continuation of application Ser. No. 08/486,666, filed Jun. 7, 1995 now U.S. Pat. No. 5,620,808; which is a continuation of Ser. No. 08/239,437, filed May 6, 1994, issued as U.S. Pat. No. 5,489,484; which is a continuation of Ser. No. 08/065,736, filed May 21, 1993, now abandoned; which is a continuation of Ser. No. 08/042,937, filed Apr. 5, 1993, now abandoned.

FIELD OF THE INVENTION

The invention relates to a cordless (i.e,. battery-operated) device such as a power tool or kitchen appliance. More particularly, the present invention relates to a battery pack and receptacle for mounting the pack in the device.

BACKGROUND OF THE INVENTION

For the consumer market, most cordless devices have a battery pack made integrally in the device housing because of reduced cost, increased end user convenience and sturdiness. However, because of the desire to provide consumer devices with detachable packs simplifying the recycling of the packs and the desire to provide a family of cordless devices using an interchangeable pack and a single charger, there is strong commercial interest in developing a sturdy, convenient, low cost, compact and easily automated battery pack. Of course, these design goals are not unique to consumer devices but also are equally desirable for professional cordless devices in which detachable packs have been the standard for many years.

SUMMARY OF THE INVENTION

Accordingly, a primary object of the present invention is to provide an improved battery pack and receptacle for mounting the pack in a cordless device embodying the foregoing design objectives.

In accordance with one aspect of the invention, a battery pack comprises an elongated cylindrical casing with a longitudinal axis of symmetry, a plurality of cells in the casing and first and second pack terminals having opposite polarities, coaxial with the casing axis and located adjacent to the casing forward end. The pack terminals are electrically connectable in a cordless device regardless of the angular Orientation of the pack about the casing axis. Such a pack provides greater end user convenience.

Preferably the casing is metal, is electrically connected to a first cell terminal of a rear cell in the pack and constitutes the first pack terminal., The second pack terminal is preferably a top disposed across the casing forward end. To provide shielding for the pack terminals, the top preferably defines a cavity in the casing forward end and has a forwardly projecting nipple fully recessed within the casing cavity.

Alternatively, the second pack terminal may be formed by a button terminal of a forward cell exposed at the casing forward end.

Alternatively, the second pack terminal may be formed by a shielded female barrel-shaped terminal fully recessed within the casing cavity.

To provide a pack with multiple output voltages, a third pack terminal may be located in the casing cavity coaxially of the casing axis, have a polarity the same as the second pack terminal and be electrically connected to a first cell terminal of a forward cell in the pack thereby electrically by passing the forward cell.

In accordance with a second aspect of the invention, a battery pack comprises a tubular metal casing, a metal base cap closing the rear end, and a fixed abutment formed in and closing the casing forward end. A plurality of electrically connected, mechanically disconnected cells are disposed end to end in the casing. The metal base cap is electrically connected to and mechanically disconnected from an adjacent rear cell and forms with the casing a first pack terminal. A second pack terminal is located at the casing forward and is electrically connected to an adjacent forward cell. A spring engages one of the cells and biases the cells tightly together in compression to form good electrical contact between adjacent cells and pack terminals to permit high current discharge rates. Such a pack has no welded connections and is, therefore, more reliable and lower in cost.

The abutment preferably is a lip formed at the forward end of the casing to terminate the casing and retain the cells and pack terminals in compression. To provide a pack with multiple output voltages, a third pack terminal is preferably compressed between the casing lip and a forward cell. The third terminal may be formed as a sleeve having (a) axial fingers engaging the forward cell can and (b) transverse fingers overlapping and helping to secure the top.

Alternatively, the abutment may be formed by an annular bead formed in the casing slightly forwardly of the forward cell.

The second pack terminal is preferably a metal top closing the casing forward end electrically connected to and mechanically disconnected from a button terminal of the forward cell. Alternatively, the second pack terminal may be constituted by the button terminal of the forward cell exposed at the casing forward end. Alternatively, the second pack terminal may be formed by a shielded female barrel-shaped terminal fully recessed within the casing cavity.

The spring is preferably formed integrally in the base cap but may also be a separate component.

In accordance with a third aspect of the invention, battery packs in accordance with either the first or the second aspect of the invention described above may include an integral plastic plug containing the second and third pack terminals separated by an insulating wall. The second terminal is preferably a tubular nipple filled with plastic and further preferably covered by a plastic projection extending forwardly from the forward end of the nipple.

In accordance with a fourth aspect of the invention, a cordless device comprises a davity, a receptacle in the cavity and a battery pack in accordance with either the first, second or third aspect of the invention described above. The pack is electrically connectable in the receptacle regardless of the angular orientation of the pack about the casing axis.

The receptacle preferably comprises a, housing defining a cavity having a longitudinal axis coaxial to the casing axis when the pack is mounted in the receptacle. The receptacle further includes an appropriate number of receptacle terminals for mating with a pack having either two or three pack terminals.

The receptacle terminals are preferably coaxially located about the receptacle cavity axis.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in and constitute a part of, this specification illustrates eight embodiments to the present invention and together with the description serve to explain the principles of the invention. In the drawings, the same reference numerals indicate the same parts.

DESCRIPTION OF THE PREFERRED EMBODIMENT

Figure 1:
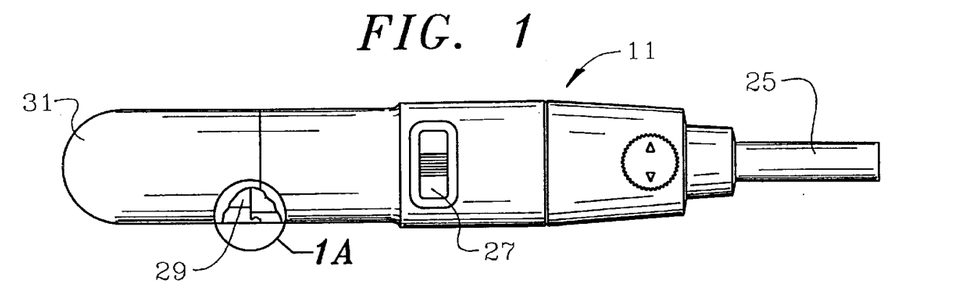
FIG. 1 is a top plan view of a cordless device in accordance with the present invention.
Figure 1A:
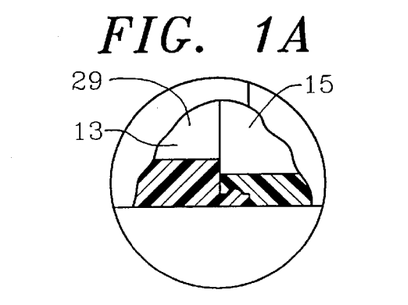
FIG. 1A is an enlarged view of a portion 1A of FIG. 1.

The preferred embodiment of the present invention is a cordless (i.e., battery operated) device such as a kitchen appliance or a power tool. One example of such a device is a cordless screwdriver 11 as shown in FIG. 1. The preferred embodiment, more particularly, is an improved battery pack 28 (FIGS. 15, 16) and an improved receptacle 15 (FIGS. 7–9) for electrically connecting battery pack 28 in device 11.

Seven nonpreferred embodiments of battery packs 13, 17, 19, 21, 22, 24, 26 in accordance with the present invention, are shown in FIGS. 2–6 and 10–14.

As shown in FIGS. 1–4, in accordance with the present invention, cordless device 11, here exemplified as an inline screwdriver, comprises a housing 23 for receiving battery pack 13, a motor (not shown), an output spindle 25, a gear train (not shown) intermediate the motor and spindle 25, and a receptacle 15 for electrically connecting pack 13 to the motor through a motor control circuit (not shown) including on/off and speed control switch 27. Housing 23 further includes, a generally cylindrical cavity 29 in a handle portion 31 of housing 23 for receiving pack 13 and receptacle 15. According to one aspect of the present invention, the battery pack 13 is removably located in cavity 29 and is electrically connectable to receptacle 15 regardless of the angular orientation of pack 13 about a longitudinal axis of symmetry 33 of pack 13. (This aspect of the invention is sometimes referred to hereinafter as the "universal angular orientation feature"). Pack 13 is thus easier to use and may be easily loaded in device 11 under adverse conditions such as in dim light or in cramped quarters.

Figure 2:
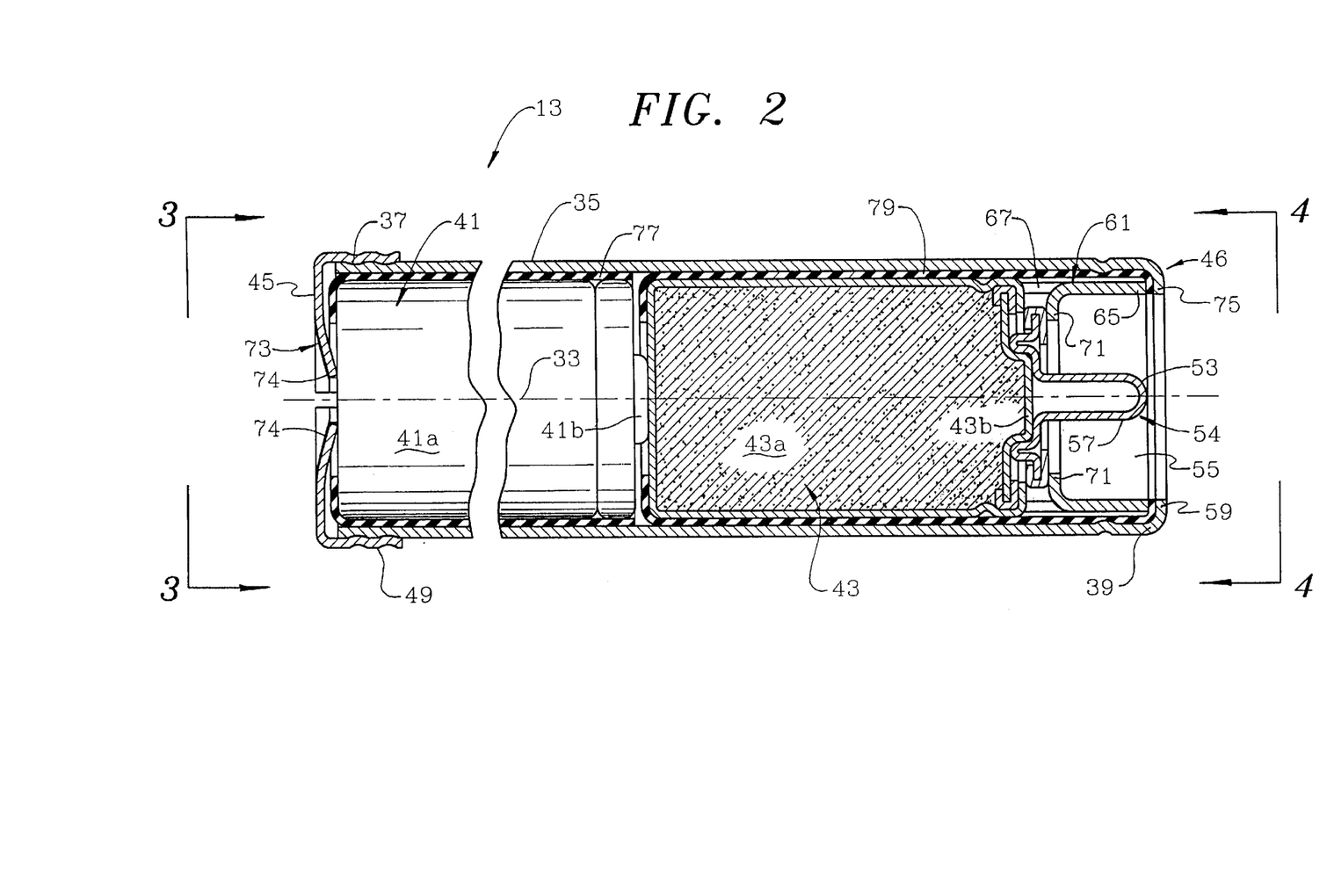
FIG. 2 is an axial cross-sectional view of the battery pack in the cordless device in FIG. 1.

Pack 13 comprises an elongated cylindrical tubular metal casing 35 having opposed rear and forward ends 37, 39. A plurality of electrically connected, mechanically disconnected cells 41, 43 are disposed end to end in casing 35. For simplicity, pack 13 is illustrated in FIG. 2 with two cells 41, 43. However, the present invention is equally applicable to packs including two or more cells. Each cell, 41, 43 has a cell can 41a, 43a for forming a first cell terminal and a button terminal 41b, 43b closing one end of the cell and forming a second cell terminal. As is conventional, the first or cell can terminal 41a, 43a is negative and the second or button terminal 41b, 43b is positive. Cells 41, 43 are preferably nickel-cadmium cells which are preferred for high discharge rate applications (5 to 30 amps) such as power tools and certain kitchen appliances. However, the present invention is also equally applicable to other rechargeable and primary cell couples such as nickel metal hydride or primary alkaline cells.

A metal base cap 45 (FIGS. 2, 3) closes casing rear end 37 and is electrically connected to and mechanically disconnected from the rear cell 41 adjacent casing rear end 37 and forms one pack terminal 46. The connection between base cap 45 and casing 35 may be made in a number of different ways. A one way serrated snap fit connection 49 depicted in FIG. 2 is preferred. Alternative connections are, for example, a one piece connection 47 depicted in FIG. 5 and a removably threaded connection 51 depicted in FIG. 6. Connection 49 permits cells 41, 43 to be loaded through casing rear end 37 and thereafter base cap 45 is fixed to casing 35 and is not removable for end user servicing. A one piece connection 47 (FIG. 5) is used when assembly of the cells through casing forward end 39 is desired. If end user servicing of the pack 13 is desired, for example, when primary cells are used, removably threaded connection 51 (FIG. 6) may be used.

Through the connection of metal base cap 45 to metal casing 35, any part of casing 35 may be utilized as the first cell terminal 46. One advantage of the present invention is that casing 35 is coaxial of the pack longitudinal axis 33 and a coaxial portion of casing 35 adjacent to casing forward end 39 may be utilized as the first pack terminal 46. In prior art packs, a strap is usually welded between a forwardly located terminal and the rearmost cell of the pack. In the present invention, because casing 35 forms pack terminal 46, a welded strap is not required.

A metal top 53 closes the casing forward end 39, is electrically connected to button terminal 43b and forms a second pack-terminal 54. Top 53 is radially symmetrical about casing axis 33 and defines a cavity 55 in the casing forward end 39. A forwardly projecting nipple 57 formed on top 53 is fully recessed within casing cavity 55 and terminates rearwardly of a forward edge 59 of casing 35. Top 53 is electrically connected to and mechanically disconnected from forward cell 43 through engagement with button terminal 43b.

As will be appreciated, first and second pack terminals 46, 54 have opposite polarities (preferably, negative and positive, respectively), are coaxial with the casing axis 33 and are located adjacent to the casing forward end 39. And, for those reasons, pack 13 is easily connectable in cordless device 11 regardless of the angular orientation of pack 13 about pack axis 33.

In accordance with another feature of the present invention, the first, second and a third coaxial pack terminals 46, 54, 61 (FIG. 2) are coaxial with the pack longitudinal axis 33 and are located adjacent to casing forward end 39. The first pack terminal 46 has a polarity opposite to the polarity of the second and third pack terminals 54, 61. The output voltage between the first and second pack terminals 46, 54 is greater than the output voltage between the first and third pack terminals 46, 61. In the present embodiment, the first pack terminal 46 is electrically connected to the first cell terminal 41a of rear cell 41. The second pack terminal 54 is electrically connected to the second terminal. 43b of forward cell 43. The third pack terminal 61 is electrically connected to the first terminal. 43a of the forward cell 43 and is, in turn, electrically connected to the second terminal 41b of rear cell 41 thereby electrically by-passing forward cell 43 and providing an output voltage (relative to the first pack terminal 46) which is less than the output voltage between first and second pack terminals 46, 54.

For a two cell pack as depicted in FIG. 2, the first pack terminal 46 is negative. The second and third pack terminals 54, 61 are positive and have respectively relative to first pack terminal 46 an output voltage (for Ni-Cd cells) relative to first pack terminal 46 of 1.2 volts and 2.4 volts, respectively. Thus, pack 13 in accordance with the present invention is particularly advantageous for use in cordless devices such as a screwdriver, mixer or drill where multiple power settings are desirable.

Figure 2A:
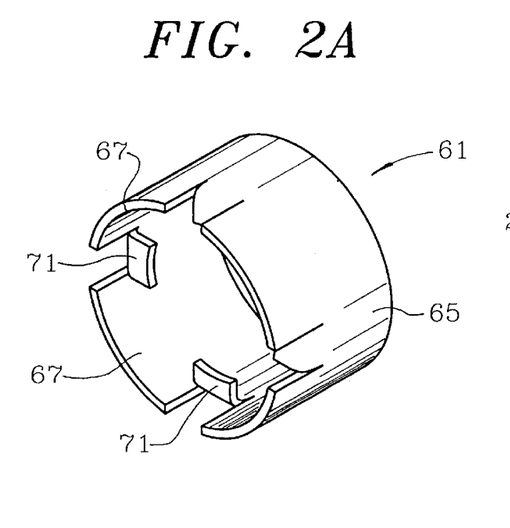
FIG. 2A is a perspective view of a third terminal for the battery pack in FIG. 2.
Figure 3:
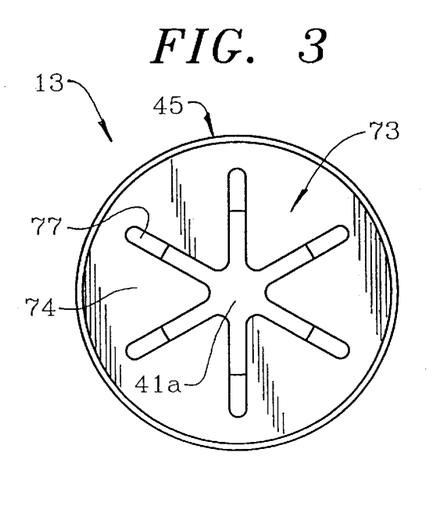
FIG. 3 is an rear elevational view taken along line 3—3 of FIG. 2.
Figure 4:
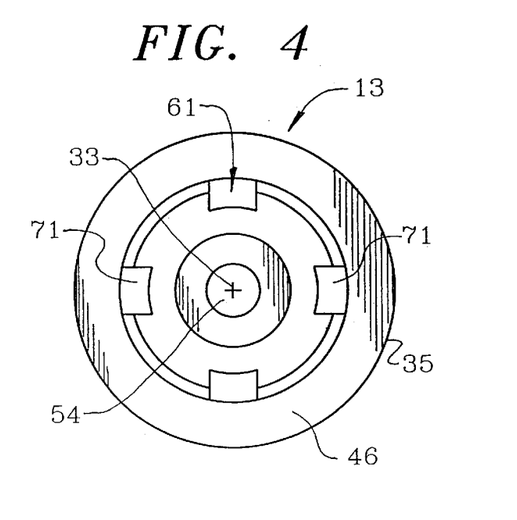
FIG. 4 is a front elevational view taken along line 4—4 of FIG. 2.

As shown in FIGS. 2, 2a, third pack terminal 61 is preferably formed as a sleeve 65 located in casing cavity 55 coaxially of casing axis 33. Sleeve 65 has axial fingers 67 in engagement with the forward cell can 43a and transverse fingers 71 overlapping and helping to secure the top 53. An insulator 72 insulates top 53 from transverse fingers 71. (FIG. 2A shows a rear perspective view of sleeve 65.)

In accordance with another aspect of the present invention, cells 41, 43, metal base cap 45 constituting the first pack terminal 46 and metal top 53 constituting the second pack terminal 54 are electrically connected but mechanically disconnected. Good electrical contact between adjacent cells 41, 43 and terminals 46, 54 for low resistance, high current discharge rates is achieved through a spring 73 engaging one of the cells 41 and biasing the cells 41, 43 tightly together in compression in metal casing 35.

A fixed abutment 75 is formed in casing forward end 39, extends inwardly of the periphery of forward cell 43 and retains cells 41, 43 in compression in casing 35.

For the present invention, a high discharge rate is defined as between about 5 to 30 amps. A low resistance is defined as less than one million. To achieve a suitable low resistance of less than one million, a force of at least 10 to 15 pounds is required to be established by spring 73.

As embodied herein, fixed abutment 75 is constituted by a lip 75 formed at the forward end 43 of casing 35. Third pack terminal 61 is compressed between casing lip 75 and forward cell 43 to provide to good electrical contact to one terminal of forward cell 43. Thus, pack 13 has no welded connections and, therefore, has a lower cost compared to other battery packs particularly suited for high discharge rate applications.

Figure 5:
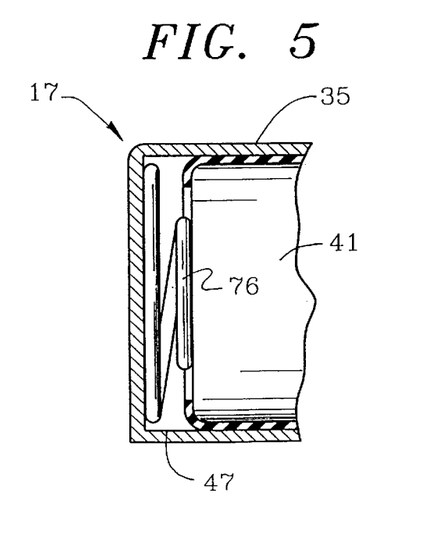
FIG. 5 is a fragmentary axial cross-sectional view of an second embodiment of a battery pack in accordance with the present invention. An alternative base cap connection for the pack in FIG. 2 is shown.
Figure 6:
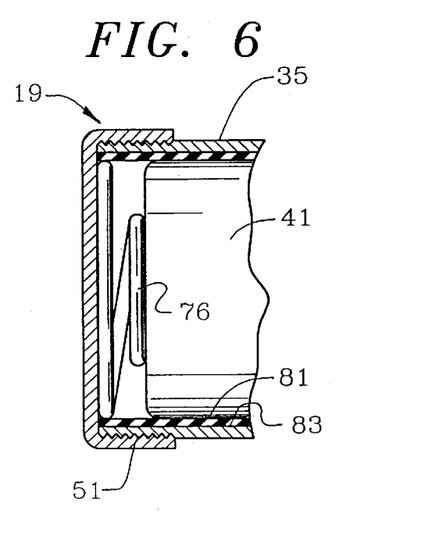
FIG. 6 is a fragmentary axial cross-sectional view of a third embodiment of a battery pack in accordance with the present invention. Another alternative base cap connection for the pack of FIG. 2 is shown.

Spring 73 is preferably integrally formed in base cap 45 and has a plurality of transverse arms 74 engaging rear cell can 41a. Alternatively, as shown in FIGS. 5, 6, the spring may be formed as an independent component such as coil spring 76 compressed between base cap 43 and rear cell 41.

To electrically insulate each cell 41, 43 from casing 35, each cell 41, 43 is enclosed within an electrically insulating sleeve 77, 79. Because cell 41 is at the same potential as casing 13, insulating sleeve 77 serves only to provide a uniform outer cell diameter for mechanically locating cells 41, 43 in casing 13. Alternatively, as shown in FIG. 6, insulating sleeves 77, 79 may be replaced by a layer of electrical insulation 81 laminated to an inner wall 83 of casing 13. Layer 81 may be applied to cabing wall 83 through a conventional coating process. If it is desired to recharge pack 13 with a temperature cutoff charge termination circuit, the material for electrically insulating sleeves 77, 79 is chosen to have a high thermal conductivity. By using thermally conductive sleeves in combination with metal casing 35, pack 13 has enhanced thermal conductivity. And during charging, the temperature of pack 13 can be more accurately measured by a thermally responsive device in the charge termination circuit.

Figure 7:
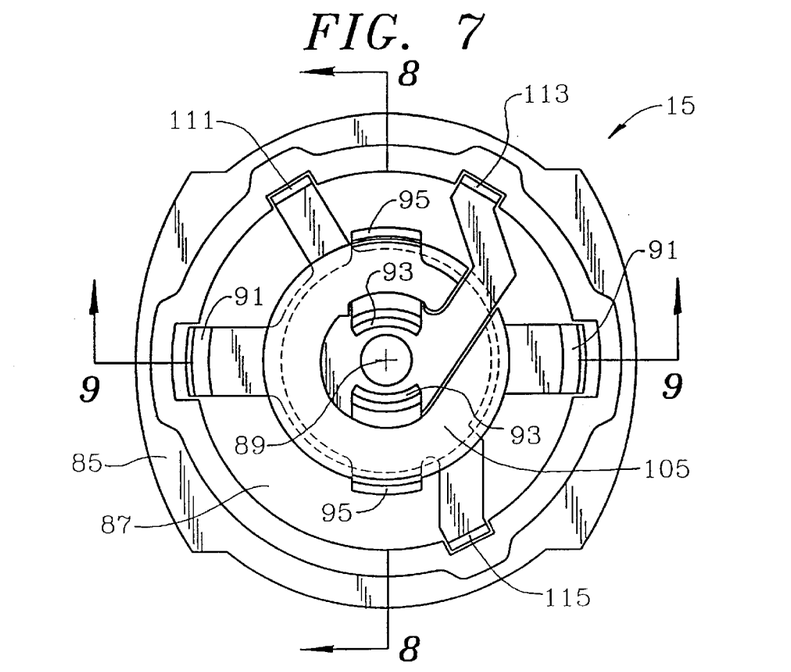
FIG. 7 is a top plan view of a receptacle for the cordless device of FIG. 1 in accordance with the present invention.
Figure 8:
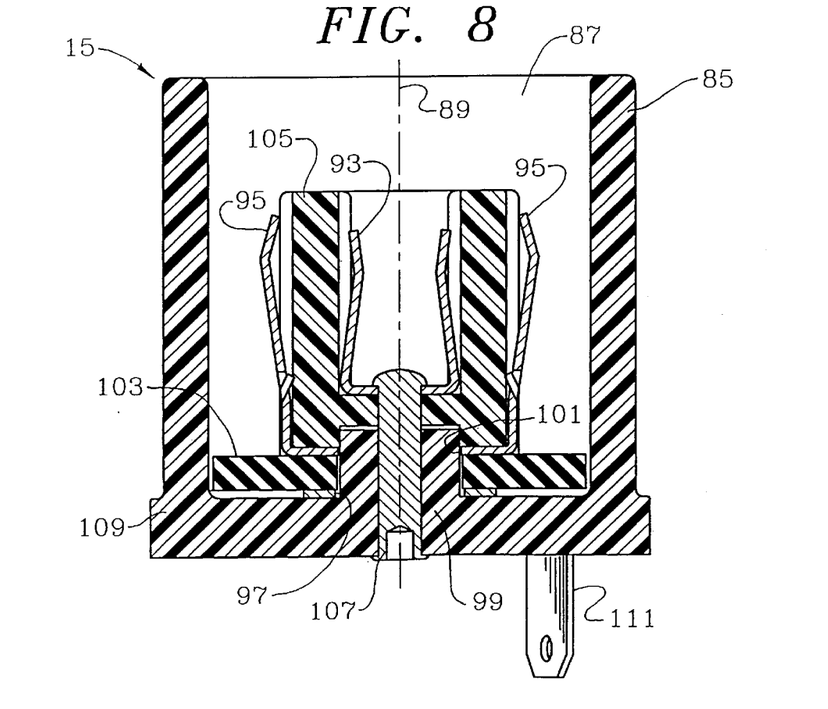
FIG. 8 is a cross-sectional view of the receptacle taken along line 8—8 of FIG. 7.
Figure 9:
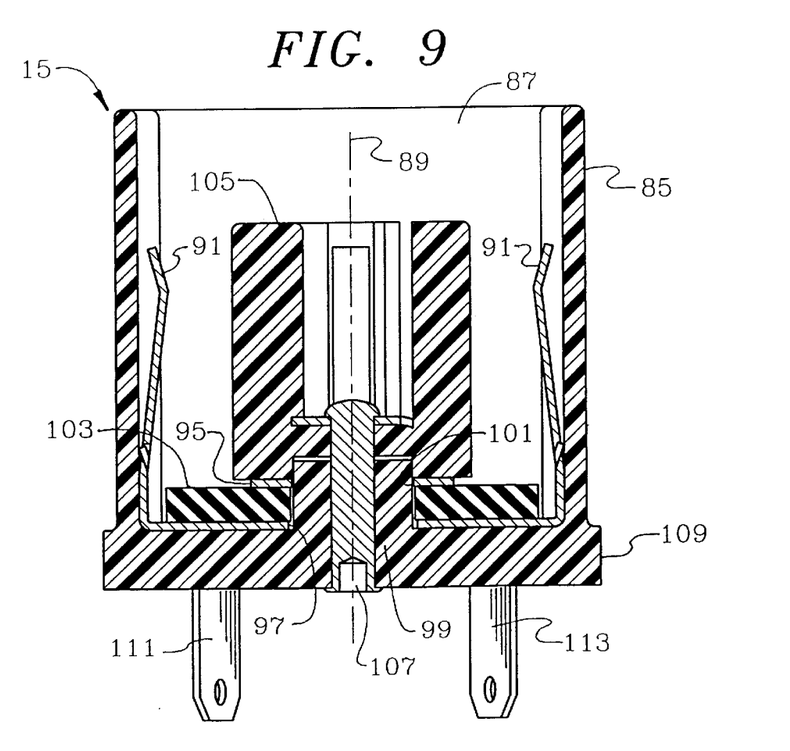
FIG. 9 is a cross-sectional view of the receptacle taken along line 9—9 of FIG. 7.

As shown in FIGS. 7–9, receptacle 15 electrically connects packs 13 in device 11 regardless of the angular orientation of pack 13 about pack axis 33. Receptacle 15 has a housing 85 defining a cavity 87 having a longitudinal axis 89 coaxial to pack axis 33 when the casing forward end 39 is mounted in cavity 87. Receptacle 15 further includes a first u-shaped receptacle terminal 91 adjacent housing 85 for resiliently clamping first pack terminal 46, a second unshaped receptacle terminal 93 adjacent to the receptacle cavity axis 89 for mating with second pack terminal 54 and a third unshaped receptacle terminal 95 intermediate the first and second receptacle terminals 91, 93 for resiliently engaging third pack terminal 61. Each receptacle terminals 91, 93, 95 extends outwardly from cavity 87 and is radially symmetrical about axis 89. The first receptacle terminal 91 has a central opening 97 which surrounds a housing post 99. Third receptacle terminal 95 has a central opening 101 which surrounds post 99. An insulating washer 103 surrounds post 99 and electrically insulates first and third terminals 91, 95. A cup-shaped insulator 105 is supported on the top of post 99 and supports second receptacle terminal 93 at the bottom and electrically insulates second and third receptacle terminals 93, 95. An axially extending rivet 107 integrally connects first, second and third receptacle terminals 91, 93, 95 and insulators 103, 105.

To electrically connect first, second and third receptacle terminals 91, 93, 95 in a motor control circuit (not shown) of device 11, each terminal 91, 93, 95 has respectively an integrally formed blade 111, 113, 115 extending through an end wall 109 of housing 85.

Figure 10:
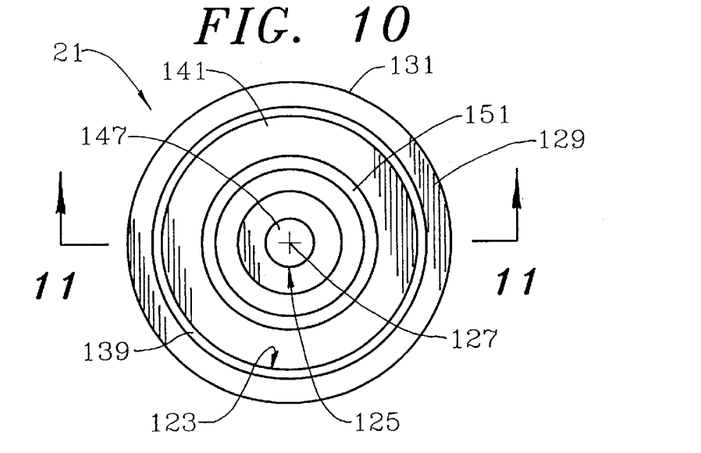
FIG. 10 is a top plan view of a fourth embodiment of a battery pack in accordance with the present invention.
Figure 11:
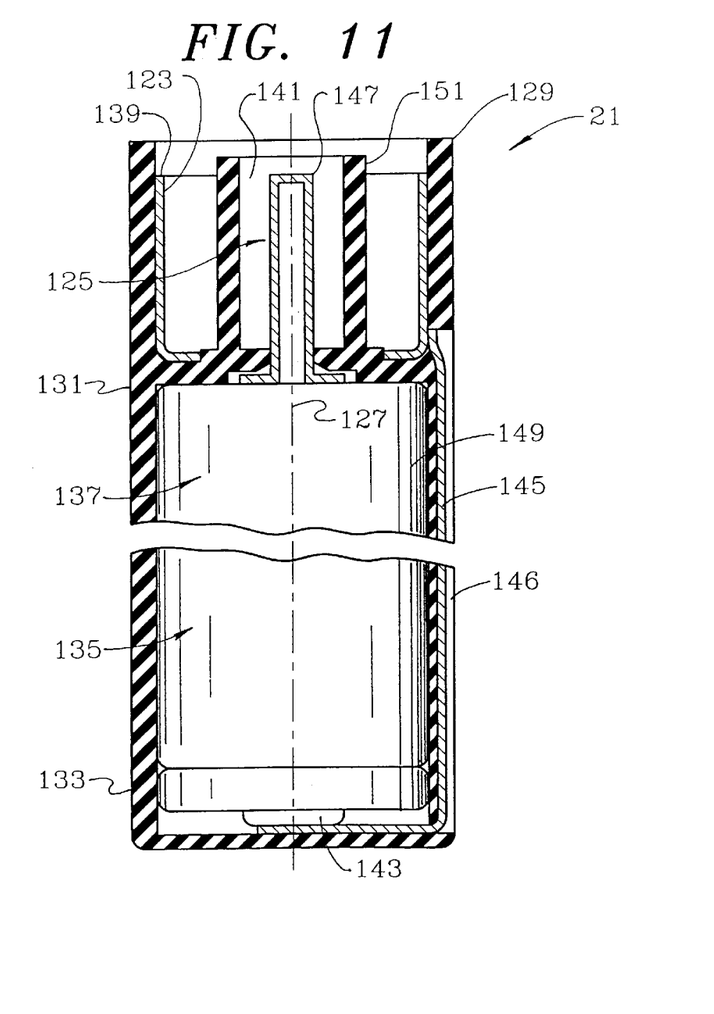
FIG. 11 is a cross-sectional view of the pack taken along line 11—11 of FIG. 10.

FIGS. 10 and 11 show a nonpreferred fourth embodiment of a battery pack 21 having first and second pack terminals 123, 125 which are coaxial with a longitudinal pack axis 127, are located adjacent to a casing forward end 129 and are electrically connectable to a receptacle (not shown) regardless of the angular orientation of pack 21 about casing axis 127. Pack 121 does not share with pack 13 two of the other primary features achievable in pack 13, the preferred embodiment, namely, a nonwelded construction and multiple output voltages.

Pack 21 comprises an elongated cylindrical casing 131 having longitudinal axis of symmetry 127 and having opposed rear and forward ends 133, 129. In this embodiment, casing 131 is preferably constructed of plastic molded in a clam shell configuration with a parting line (not shown) lying in an axially extending plane. A plurality of cells 135, 137 are mounted in casing 131. Cells 135, 137 are preferably identical to cells 41, 43. The first pack terminal 123 is formed as a sleeve 139 located in a casing cavity 141. A first or positive cell terminal 143 is electrically connected to pack terminal 123 through a metal strap 145 spot welded to cell terminal 143 at one end and to pack terminal 123 at the other. Strap 145 lies in an axially extending channel 146 in casing 131. Channel 146 opens externally of casing 131 and electrically insulates strap from cells 135, 137.

Pack terminal 125 is preferably formed as a narrow tubular pin 147 spot welded to the second or negative can terminal 149 of cell 137. A cylindrical wall 151 is located between terminals 123, 125 and reduces the likelihood of shorting terminals 123, 125. Furthermore, wall 151 may be used to actuate a shutter or shield for preventing inadvertent contact with the terminals of a battery charger for pack 121.

Pack 21 may be used with a receptacle similar to that shown in FIGS. 7–9 except that receptacle terminal 91 would be omitted as pack 21 has only two coaxial terminals 123, 125 rather than three.

Figure 12:
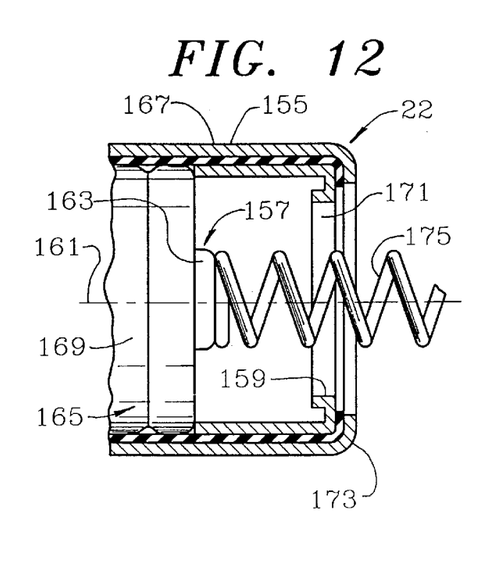
FIG. 12 is a fragmentary cross-sectional view showing a fifth embodiment of a battery pack and one terminal of a compatible receptacle in accordance with the present invention.

FIG. 12 shows a nonpreferred fifth embodiment of a battery pack 22 in accordance with the present invention. Pack 22 has first, second and third pack terminals 155, 157, 159 which are coaxial with a longitudinal pack axis 161 and are electrically connectable to a receptacle (not shown) regardless of the angular orientation of pack 22 about pack axis 161. Pack 22 is identical to pack 13 except for the construction of second and third pack terminals 157, 159 and thus shares with pack 13 three of the primary features achievable in pack 13, the preferred embodiment, namely, universal angular orientation, a nonwelded construction and multiple output voltages.

The second pack terminal 157 is constituted by a button terminal 163 of a forward cell 165 adjacent casing forward end 167.

The third pack terminal 159 is electrically connected to first or can terminal 169 of the forward cell 165 and is, in turn, electrically connected to a second button terminal of a rear cell (not shown) thereby electrically bypassing forward cell 165 and providing an output voltage (relative to the first pack terminal 155) which is less than the output voltage between first and second pack terminals 155, 157. Third pack terminal 159 is preferably formed as a sleeve located in a casing cavity 171 and is compressed between casing lip 173 and forward cell 165 to provide good electrical contact to first can terminal 169 of forward cell 165.

Pack 22 may be used with a receptacle (not shown) identical to that shown in FIGS. 7–9 except that second receptacle terminal 93 would be replaced by a coil spring terminal 175 (shown in FIG. 12). Spring 175 is anchored in the receptacle. And thus, FIG. 12 illustrates only the manner for making electrical contact to second pack terminal 157 when pack 22 is inserted in a cordless device. An advantage provided by pack 22 compared to pack 13 is that pack 22 utilizes button terminal 63 as the second pack terminal rather than a separate top 53 for the second pack terminal 54 in pack 13 (FIG. 2). And thus, pack 22 requires fewer parts and assembly steps.

Figure 13:
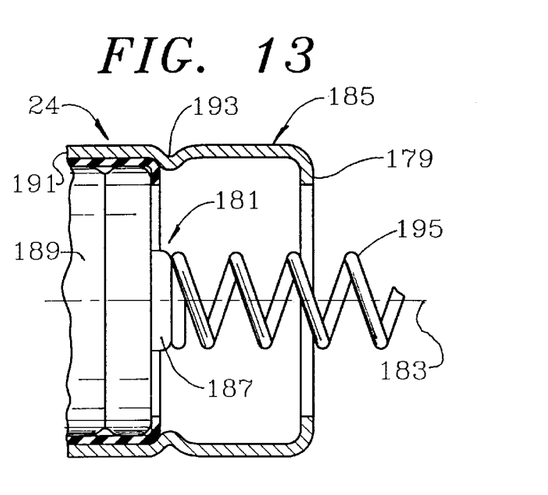
FIG. 13 is a fragmentary cross-sectional view of a sixth embodiment of a battery pack and one terminal of a compatible receptacle in accordance with the present invention.

FIG. 13 shows a nonpreferred sixth embodiment of a battery pack 24 according to the present invention. Pack 24 has first and second pack terminals 179, 181 which are coaxial with a longitudinal axis 183, are located adjacent to a casing forward end 185 and are electrically connectable to a receptacle (not shown) regardless of the angular orientation of pack 24 about pack axis 183. Pack 24 is identical to pack 13 except for the construction of second pack terminal 181 and the omission of a third pack terminal for providing a second output voltage. Thus, pack 24 shares with pack 13 two of the primary features achievable in pack 13, the preferred embodiment, namely, a nonwelded construction and a universal angular orientation.

Second pack terminal 181 is constructed identically to second pack terminal 157 of pack 22 (FIG. 12) and is constituted by a button terminal 187 of forward cell 189.

By omission of a third pack terminal in pack 24, the cells 189 are biased tightly together in compression in metal casing 191 between a base cap (not shown) and annular bead 193. Bead 193 is formed in casing 191 slightly forwardly of forward cell 189, extends radially inwardly of the periphery of cell 189 and serves as a fixed abutment for retaining the cells in compression.

Pack 24 may be used with a receptacle similar to that shown in FIGS. 7–9 except that (a) second receptacle terminal 93 would be replaced by a coil spring terminal 195 identical to coil spring terminal 175 provided for pack 22 and (b) third receptacle terminal 95 would be omitted because of the omission of the third pack terminal in pack 24.

Figure 14:
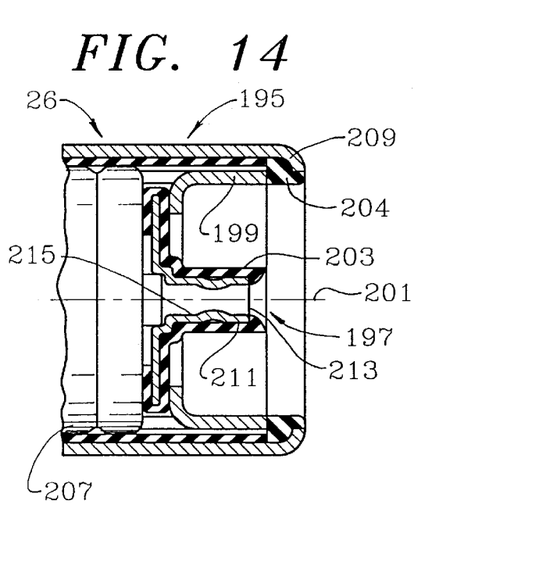
FIG. 14 is a fragmentary cross-sectional view showing a seventh embodiment of a battery pack in accordance with the present invention.

FIG. 14 shows a nonpreferred seventh embodiment of a battery pack 26 in accordance with the present invention. Pack 26 has first, second and third pack terminals 195, 197, 199 which are coaxial with a longitudinal pack axis 201 and are electrically connectable to a receptacle (not shown) regardless of the angular orientation of pack 26 about pack axis 201. Pack 26 is identical to pack 13 except for the construction of second pack terminal 199 and insulator 203 and the addition of supplemental insulator 204. And thus, pack 26 shares with pack 13 three of the primary features achievable in pack 13, the preferred embodiment, namely, universal angular orientation, a nonwelded construction and multiple output voltages.

The second pack terminal 197 is constituted by a female, open ended, barrel-shaped, axially slotted terminal 197 that is press fitted on a button terminal 205 of a forward cell 207 adjacent casing forward end 209. To provide increased resistance to inadvertent short circuiting between second pack terminal 197 and either third pack terminal 199 or first pack terminal 195, insulator 203 (which electrically insulates the second and third pack terminals 197, 199) completely surrounds an outer wall 211 and a forward edge 213 of barrel terminal 197. Also, insulator.204 surrounds the inner edge of casing forward end 209 to enchance the shielding between pack terminals 195, 199.

Pack 26 may be used with a receptacle (not shown) identical to that shown in FIGS. 7–9 except that second receptacle terminal 93 (FIG. 8) would be replaced by a pair of closely spaced, cantilevered spring fingers (not shown) which extend generally parallel to receptacle axis 89 and are bowed convexly outwardly relative to axis 89. When pack 26 is plugged into the receptacle (not shown), the fingers would resiliently engage an inner wall 215 of barrel terminal 197. Alternatively, receptacle terminal 93 may be replaced by a pin (not shown) extending coaxially of axis 89.

Figure 15:
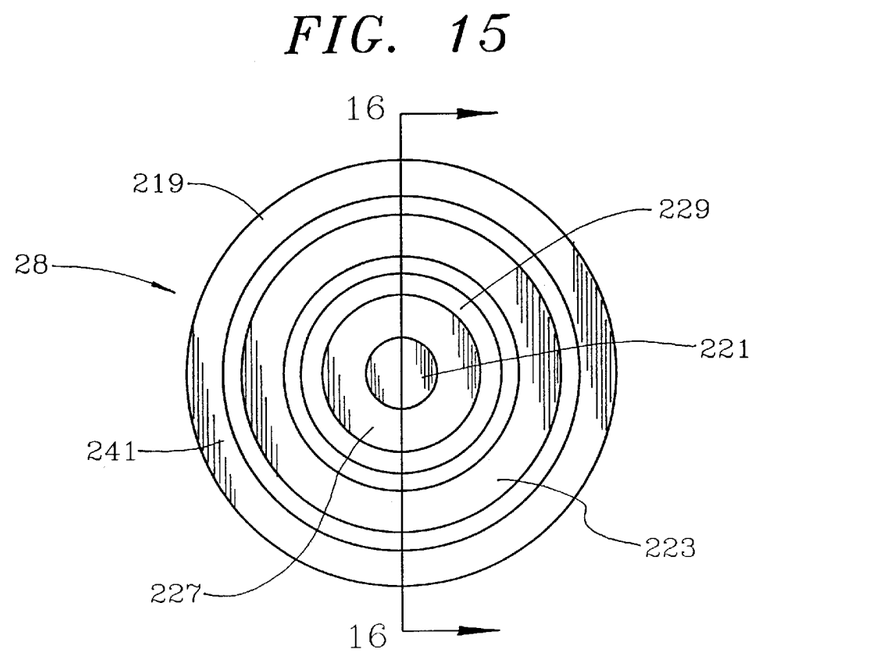
FIG. 15 is a top plan view of an eighth embodiment of a battery pack in accordance with the present invention.
Figure 16:
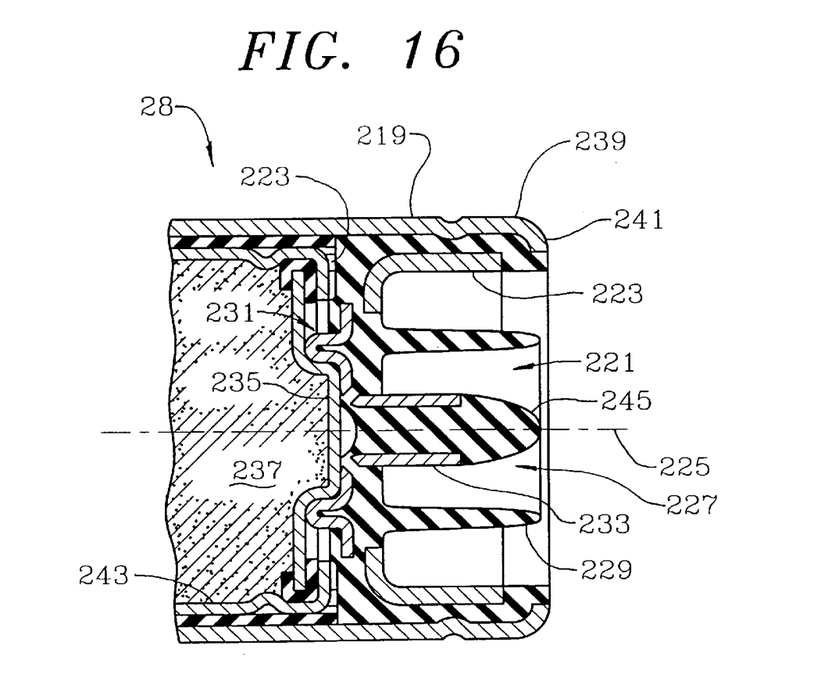
FIG. 16 is a fragmentary cross-sectional view of the pack taken along line 16—16 of FIG. 15.

FIGS. 15 and 16 show a preferred eighth embodiment of a battery pack 28 in accordance with the present invention. Pack 28 has first, second and third pack terminals 219, 221, 223 which are coaxial with a longitudinal pack axis 225 and are electrically connectable to a receptacle (not shown) regardless of the angular orientation of pack 28 about pack axis 225. Pack 28 is identical to pack 13 (FIG. 2) except for the construction of second pack terminal 221 and a plug 227 for integrally joining second terminal 221 and third terminal 223 (identical to third terminal 61 of pack 137 and incorporating an electrically insulating wall 229. And thus, pack 28 shares with pack 13 three of the primary features achievable in pack 13, the preferred embodiment, namely, universal angular orientation, a nonwelded construction and multiple output voltages.

The second pack terminal 221 is constituted by a metal top 231 terminating in a forwardly projecting, open ended, tubular nipple 233. Top 231 is press fitted on a button terminal 235 of a forward cell 237 adjacent casing forward end 239. To provide increased resistance to inadvertent short circuiting between second pack terminal 221 and either third pack terminal 223 or first pack terminal 219, annular insulating wall 229 surrounds nipple 233 and separates third terminal sleeve 223 and nipple 233. The top 231, sleeve 223 and insulating wall 229 are integrally molded to form plug. 227 in accordance with conventional plastic injection insert molding techniques. Plug 227 is compressed between the casing abutment 241 at the forward end of plug 227 and button terminal 231 and cell can 243 of forward cell 237 at the rear end of plug 227.

To further enhance the resistance to short circuiting, nipple 233 is filled with plastic and has a plastic projection 245 that extends forwardly from and covers the top of nipple 233.

Pack 28 may be used with a receptacle (not shown) substantially identical to that shown in FIGS. 7–9 except that cup-shaped insulator 105 must be eliminated or reconfigured to permit insulating wall 229 of pack 28 to be received within receptacle cavity 87.

In accordance with the present invention, the disclosed pack terminals and receptacle terminals and their variants suitable for providing the universal angular orientation of the pack and receptacle may be defined as terminal means for electrically connecting the pack and receptacle together regardless of the angular orientation, relative to the receptacle, of the pack about the casing axis. It will be recognized that there are a number of suitable variants. For example, to accomplish the universal angular orientation, preferably, (a) the pack terminals are coaxial about the pack axis, (b) the receptacle terminals are coaxial about the receptacle axis and (c) when the pack is inserted in the receptacle, the pack axis and receptacle axis are coaxial. However, only one of the sets of terminals (the pack terminals constituting one set and the receptacle terminals constituting the second set) must be coaxial. For example, each receptacle terminal may be constituted by a flat blade positioned to be resiliently engageable with a mating pack terminal of a coaxial set of pack terminals. Thus, in this example, the pack terminals are coaxial about a longitudinal pack axis and the receptacle terminals are not coaxial about a longitudinal receptacle axis. Furthermore, continuous annular members are used to form the coaxial pack terminals in packs 13, 21, 22, 24, 26, 28 and discontinuous annular members are used to form the receptacle terminals Alternatively, discontinuous annular members may be used to form the pack terminals and continuous annular members may be used to form the receptacle terminals. In accordance with the present invention, all of these terminal configurations are included in the definition of the terminal means.

As will be appreciated by those skilled in the art, a number of advantages flow from the present invention. Namely, packs 13, 21, 22, 24, 26, 28 have two or more coaxial terminals permitting the packs to be connected in a cordless device regardless of the angular orientation of the pack about its axis. As a result, packs 13, 21, 22, 24, 26, 28 are easier to use particularly under adverse conditions for loading the pack in a cordless device or charger. Additionally, because packs 13, 21, 22, 24, 26, 28 have no preferred angular orientation, the packs are particularly suited for complete enclosure within a cordless device. This is particularly desirable, for example, in certain household appliances where the requirement of an exposed battery pack limits industrial design freedom.

Secondly, packs 13, 22, 24, 26, 28 provide a lower cost, more reliable battery pack particularly suited for high discharge rate applications through the elimination of the welded connections between adjacent cells and pack terminals. In prior art packs, welded connections are a common source of pack failure. Packs 13, 22, 24, 26, 28 also potentially have a lower cost than prior art packs because the enclosure of the cells within a metal casing which is sealed by a rolled over lip 75 or bead 193 permits the manufacturing process to be easily varied to accommodate packs having different lengths based on the number of cells in the pack.

Finally, the three coaxial pack terminals 46, 54, 61; 155, 157, 159 permit the selective and easy connection of different numbers of cells in the motor control circuit of a cordless device. Thus, packs 13, 22 are particularly suited for applications requiring multiple power settings. Other advantages will be apparent to those skilled in the art.

It will be apparent to those skilled in the art that various modifications and variations can be made in the cordless device and battery pack of the present invention without departing from the scope or spirit of the invention. Thus, it is intended that the present invention cover these modifications and variations provided they come within scope of the appended claims and their equivalents.

We claim:

1. A cordless device system with an interchangeable battery pack comprising:

a first type of cordless device comprising a first cavity and a first receptacle in the first cavity;

a second type of cordless device comprising:

a second cavity;

a second receptacle in the second cavity, said receptacle having a housing defining a receptacle cavity, the receptacle cavity having a longitudinal axis;

a first u-shaped receptacle terminal disposed within the receptacle cavity;

a second u-shaped receptacle terminal disposed within the receptacle cavity; and a battery pack removably locatable in both the first and second cavities, said battery pack including an elongated cylindrical casing having a longitudinal axis of symmetry coaxial to the longitudinal axis of the receptacle cavity and opposed rear and forward ends, a plurality of cells disposed in the casing, and first and second pack terminals, each said cell having first and second cell terminals; wherein, said first receptacle terminal mates with the first pack terminal and said second receptacle terminal mates with the second pack terminal, the pack terminals are coaxial with the casing axis, and the pack terminals are located adjacent to the casing forward end and are electrically connectable to the receptacle terminals regardless of the angular orientation of the battery pack about the casing axis.

2. The system of claim 1, wherein:

each cell comprises a cell can forming one cell terminal and a button terminal closing the can and forming the second cell terminal;

a metal strap is welded to the button terminal of a rear cell adjacent to the casing rear end at one end of the strap and welded to the first pack terminal at the other end of the strap; and the second pack terminal is welded to the cell can of a forward cell adjacent the forward casing end.

3. The system of claim 2, wherein:

the casing has an axially extending channel opening externally of the casing; and the strap lies in the channel.

4. A cordless device system with an interchangeable battery pack comprising:

a first type of cordless device comprising a first cavity and a first receptacle in the first cavity;

a second type of cordless device comprising a second cavity and a second receptacle in the second cavity;

a battery pack removably locatable in both first and second cavities and comprising a casing, the casing having a longitudinal axis of symmetry and having opposed rear and forward ends, and a plurality of cells in the casing;

each cell having first and second cell terminals, said casing linked electrically with the first cell terminal of the rearmost cell and thereby forming a first pack terminal at a forward end, said battery pack also comprising a second pack terminal formed at a forward end;

wherein the pack may be selectively and interchangeably connected in each of the first and second receptacles, said pack connectable in said receptacles regardless of the angular orientation, relative to the first and second receptacles, of the pack about the casing axis.

5. The system of claim 4, wherein the first and second pack terminals are coaxial.

6. The system of claim 4, wherein each receptacle has a housing defining a cavity having a longitudinal axis coaxial to the casing axis and receiving the casing forward end;

said device further comprising first and second receptacle terminals coaxial to the receptacle axis and mating respectively with the first and second pack terminals.

7. The system of claim 4, wherein a top is disposed across the casing forward end, is electrically connected to the second cell terminal of a forward cell adjacent to the casing forward end and constitutes the second pack terminal.

8. The system of claim 4, wherein each cell has a cell can forming one cell terminal and a button terminal closing one end of the cell can and forming the second cell terminal; and the button terminal of the forward cell is exposed at the casing-forward end and constitutes the second pack terminal.

9. The system of claim 4, wherein the casing has an abutment formed at the forward end of the casing and extending inwardly of the periphery of the forward cell; and a sleeve is compressed between the abutment and the forward cell, is electrically connected to the first cell terminal of the forward cell and constitutes a third pack terminal.

10. The system of claim 4, wherein the casing has a forward edge; and the top defines a cavity in the casing forward end and has a forwardly projecting nipple fully recessed within the casing cavity and terminating rearwardly of the casing forward edge.

11. The system of claim 4, wherein radius of the first terminal is larger than radius of the second terminal.

12. The system of claim 4, wherein the casing has a longitudinal axis of symmetry.

13. The system of claim 4, wherein the casing is metal.

14. The system of claim 4, wherein the forward end of said casing is open and a cavity is defined within the casing at the open forward end, and said second pack terminal is disposed within the cavity and terminates rearwardly of said open forward.

15. The system of claim 4, wherein said casing is cylindrical, each said first cell terminal comprising a cell can and each said second terminal comprising a cell button, the button terminal of the forwardmost cell being exposed at the casing forward end and constituting the second pack terminal.

16. The system of claim 4, wherein the forward end of said casing is open and a cavity is defined within the casing at the open forward end, and said button terminal of the forwardmost cell terminates rearwardly of said open forward end of said casing within the cavity.

17. The system of claim 4, wherein said pack further comprises an electrically conducting strap welded at one end to the first pack terminal and at the other end to the first cell terminal of a rearwardmost cell.

18. The system of claim 4, wherein said pack further comprises a third pack terminal.

19. The system of claim 4, wherein said first and second pack terminals are disposed symmetrically about said longitudinal axis.

20. A cordless device system with an interchangeable battery pack comprising:

a first type of cordless device comprising a first cavity and a first receptacle disposed in the first cavity, said first receptacle defining a first receptacle cavity, having a first longitudinal axis, and first and second receptacle terminals disposed within the first receptacle cavity;

a second type of cordless device comprising a second cavity and a second receptacle disposed in the second cavity, said second receptacle defining a second receptacle cavity, having a longitudinal axis, and first and second receptacle terminals disposed within the second receptacle cavity; and a battery pack interchangeably and removably locatable in both first and second cavities and comprising an elongated cylindrical casing, and a plurality of cells in the casing, the casing having a longitudinal axis of symmetry and having opposed rear and forward ends; said battery pack including first and second pack terminals; wherein, the pack may be electrically connected to the first and second receptacles regardless of the angular orientation, relative to the receptacle, of the pack about the casing axis, with said first pack terminal coming into sliding contact with said first receptacle terminal and said second pack terminal coming into contact with said second receptacle terminal of both first and second device.

21. The system of claim 20, wherein said first pack terminal comprises a sleeve disposed coaxially about the longitudinal axis of said casing.

22. The system of claim 20, wherein said first receptacle terminal of the first receptacle is u-shaped.

23. The system of claim 20, wherein the first type of cordless device is a power tool.

24. The system of claim 1, wherein the first type of cordless device is a power tool.

25. The system of claim 4, wherein the first type of cordless device is a power tool.

* * * * *